United States Patent [19]

Shepard et al.

[11] 3,738,171

[45] June 12, 1973

[54] ATTENUATION COMPENSATION FOR ULTRASONIC THERMOMETERS

[75] Inventors: Robert L. Shepard; Albert H. Malone, both of Oak Ridge, Tenn.

[73] Assignee: The United States of America as represented by the United States Atomic Energy Commission, Washington, D.C.

[22] Filed: Apr. 26, 1972

[21] Appl. No.: 247,532

[52] U.S. Cl. .............................. 73/339 A, 181/.5 J
[51] Int. Cl. .......................................... G01k 11/24
[58] Field of Search.................... 73/339 A, 194 A, 73/69:70:67.2, 67.8; 181/.5 J

[56] References Cited
UNITED STATES PATENTS
3,350,942    11/1967    Peltola............................... 73/67.8
3,572,097    3/1971    Kleesattel........................... 73/67.1

FOREIGN PATENTS OR APPLICATIONS
1,178,385    1/1970    Great Britain.................... 73/339 A OTHER PUBLICATIONS
NASA Tech. Brief; Brief No. 68-10319; August 1968, "Ultrasonic Temperature Measuring Device."

Primary Examiner—Richard C. Queisser
Assistant Examiner—Denis E. Corr
Attorney—Roland A. Anderson

[57]    ABSTRACT

A current source and control circuit are used to supply a DC bias current to the driver coil of an ultrasonic thermometer. The magnitude of the ultrasonic echo signal is thereby increased by more than a factor of two and the upper temperature sensing limit, which is due in large part to sound attenuation in the sensor, is raised.

3 Claims, 2 Drawing Figures

ATTENUATION COMPENSATION FOR ULTRASONIC THERMOMETERS

BACKGROUND OF THE INVENTION

This invention was made in the course of, or under, a contract with the United States Atomic Energy Commission.

The prior art ultrasonic system utilized in the present invention is the thin wire pulse-echo instrument called the Panatherm 5010, manufactured by Panametrics, Inc., and includes all of the structure illustrated in FIG. 1 of the drawings except the DC feed-back circuit consisting of the units 21 and 22 and the connecting wires.

Prior to the present invention it was desired to apply pulse-echo, thin-wire ultrasonic thermometry to in-pile fuel temperature measurements in high temperature nuclear reactors. At the temperatures to be measured (around 2,100°C and higher) improved techniques are needed since the above prior art system could measure temperatures only up to about 2,100°C.

The well known problem, occurring in most sensor wires, is that of sound attenuation at high temperatures. Mechanical effects such as annealing (softening), which typically begin to occur at about two-thirds of the melting point temperature, causes the reflected pulses to decrease in amplitude. When this happens, the amplitude drops below a minimum detection level, making it no longer possible to time the pulse separation and hence to measure temperature. In some cases the receiver gain can be turned up, or a higher driving voltage used, but generally there are other limitations such as distortion of the pulse shape that prevent increasing the gain or driving voltage.

It is generally known that permanent magnet biasing of the magnetostrictive transducer is capable of increasing the signal-to-noise ratio at small driving voltages. This technique consists of locating a small magnet near the magnetostrictive alloy to increase its magnetization. This practice is beneficial in increasing the temperature measuring limit of the thermometer by increasing the echo amplitudes at high temperatures, but it would produce signals too large at lower temperatures which would overload the amplifier and distort the pulse shape producing a false time interval determination. In nuclear reactors it may happen that the radiation environment or temperature in the vicinity of the transducer precludes the use of a permanent magnet or space considerations may not allow its use.

Thus, there exists a need for another technique for increasing the useful temperature measurement range of the above-mentioned prior art instrument. The present invention was conceived to meet this need in a manner to be described below.

SUMMARY OF THE INVENTION

It is the object of the present invention to provide a means for increasing the useful temperature measurement range of a thin-wire, pulse-echo ultrasonic system.

The above object has been accomplished in the present invention by a modification of the above-mentioned prior art instrument which consists of providing a DC current supply within a feedback circuit that adds a controlled DC magnetic bias to the transducer coil of the instrument in a manner to be described hereinbelow with the result that the useful temperature measurement range of the instrument is increased.

DESCRIPTION OF THE PREFERRED EMBODIMENT

Figure 1:
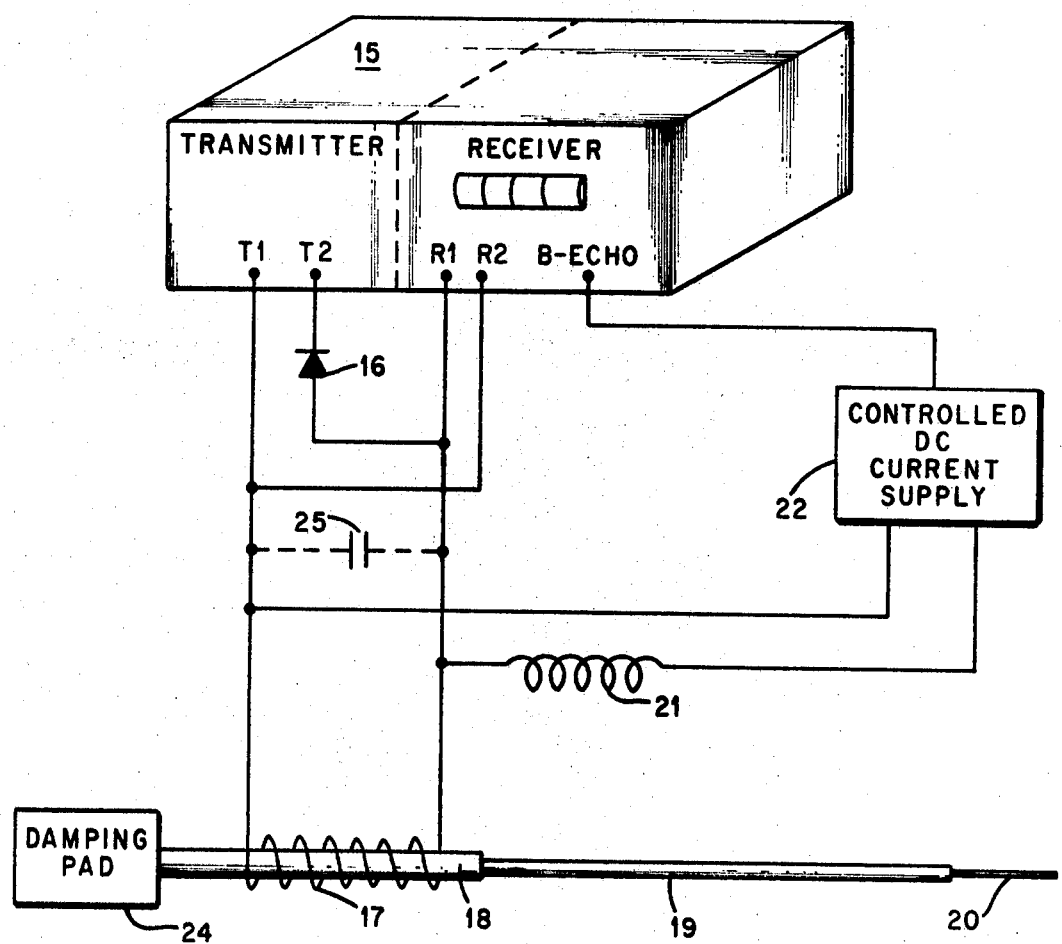
FIG. 1 is an illustration of the present invention.

The system of FIG. 1 illustrates the basic parts of a pulse echo type, thin-wire ultrasonic thermometer. Reference numeral 15 indicates a combined transmitter/receiver having a digital display. The transmitter terminals T1 and T2 are shown connected for energizing the transducer coil 17. The coil 17 also functions as the receiving coil by means of the connections to the receiver terminals R1 and R2, and by means of the blocking diode 16. The coil 17 is wound around a magnetostrictive transducer 18 that is in turn joined to the sensor wire 20 by means of the lead-in wire 19. The transducer 18 is mounted on a damping pad 24.

The system described thus far is a prior art instrument called the Panatherm 5010, manufactured by Panametrics, Inc., and operates in the following manner. An electrical driving pulse (main bang pulse) from the transmitter is applied to coil 17 and thereby energizes the transducer material 18 (usually a magnetostrictive alloy such as Remendur), launching ultrasonic stress pulses left and right. It should be noted that Remendur is a metal alloy consisting of 49 percent iron, 49 percent cobalt, and 2 percent vanadium. It is manufactured by Wilbur B. Driver Company, Newark, N.J. The ultrasonic pulse propagating along the lead-in wire 19 is partly reflected from the beginning (juncture) of the sensor 20 and partly from the end (tip) of the sensor. These two sensor echoes are termed the A-echo and B-echo pulses, respectively. They return via the wire 19 with a time interval that is a function of the sensor temperature. These reflected pulses each create a current pulse in the coil 17 and the receiver measures the time interval between the two pulses and produces the digital display.

As an added convenience for sound attenuation studies, the peak amplitudes of the pulse pair A and B are sampled and held in separate channels, and made available as DC voltage levels at panel terminals. Only the terminal for the B-echo value is shown in FIG. 1, and it is used in the present invention in a manner to be described hereinbelow. As mentioned above, this prior art instrument when used for measuring in-pile fuel temperatures in high temperature nuclear reactors was limited to the measurement of temperatures up to about 2,100°C due to the sound attenutation effect of the sensor material at high temperatures.

In order to overcome the above problems and permit the measurement of temperatures higher than 2,100°C, the above prior art instrument has been modified to accomplish this goal in the following manner.

An attenuation compensation circuit has been added to the above-escribed prior art system. This compensation circuit consists of a DC current supply within a feedback circuit that adds a controlled DC bias current to the transducer coil 17. As shown in FIG. 1, this compensation circuit includes a controlled DC current supply 22 which is connected at its operational amplifier input to receive the B-echo DC voltage level from the ultrasonic receiver 15. The output of the current supply 22 is connected in parallel with the transmitter to the driver coil 17. A choke 21 is used in one of the output leads to isolate the supply 22 from the driving pulses from the transmitter 15.

The operation of this feedback circuit is automatic. As a decrease in the B-echo amplitude is sensed, the voltage input to the supply 22 decreases. The supply 22 responds by increasing the DC current bias to the coil 17, thus increasing the magnetization of the transducer 18, and thereby tending to prevent diminishment of the echo amplitudes. In addition, a good signal-to-noise ratio is retained, thus extending the usable temperature measurement range of the instrument. In practice, the ultrasonic thermometer using DC current biasing, as shown in FIG. 1, may be operated using optimum receiver gain without pulse shape distortion at low sensor temperatures, and at higher sensor temperatures, increasing the DC coil current bias to boost the received signal without requiring an increased receiver gain.

Figure 2:
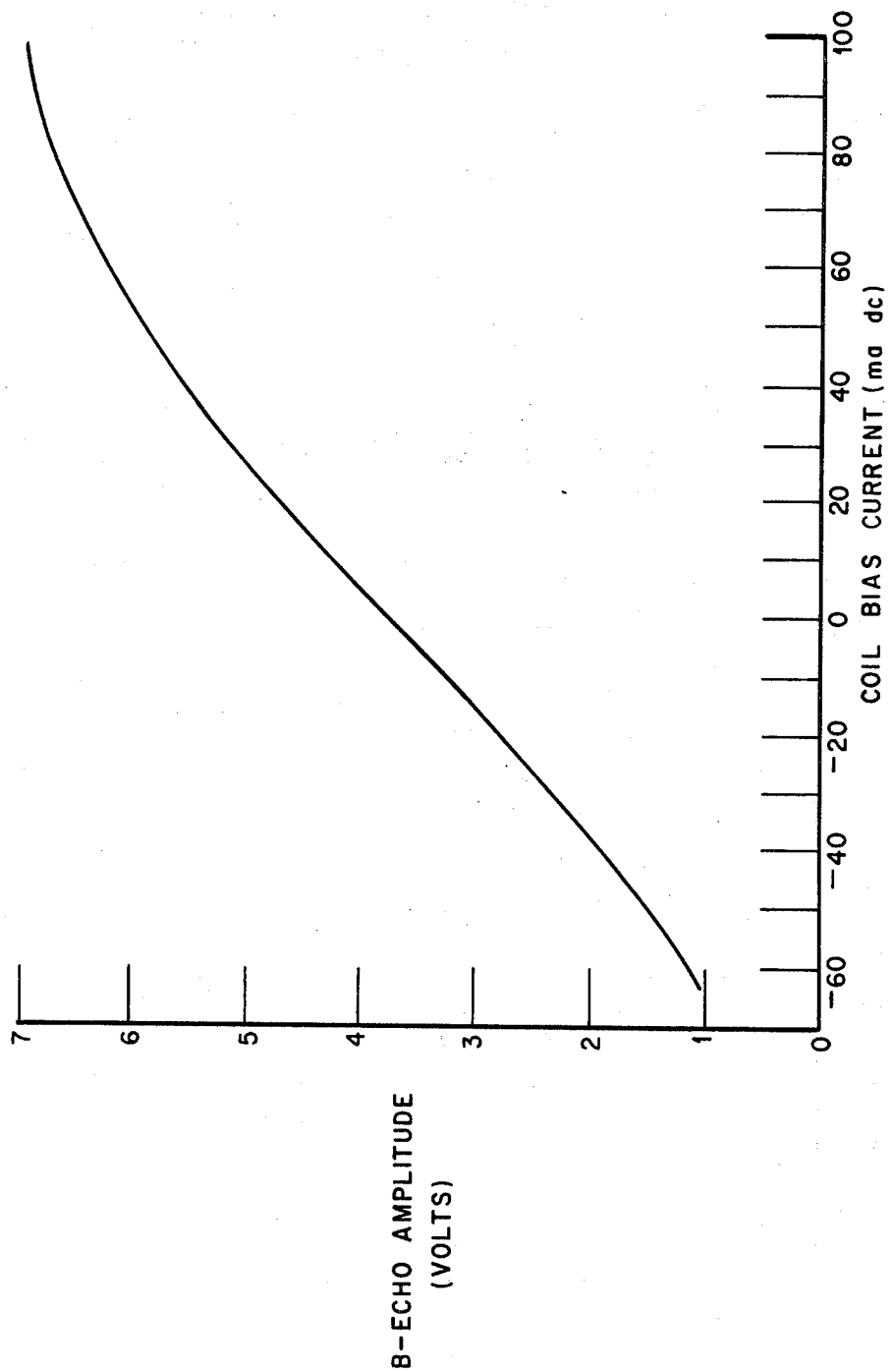
FIG. 2 is a graph showing the change in echo amplitude for various values of coil bias current.

A graph showing the effect of changes in the coil bias current on the B-echo amplitude is shown in FIG. 2. The main bang pulse amplitude from the transmitter 15 is equal to 30 volts peak, the pulse width is equal to 3 $\mu$sec., the pulse repetition rate is 120 pps, and the shunt capacitance 25 was not utilized in the operation of the system of FIG. 1 for obtaining the data for plotting the curve of FIG. 2. The magnitude of the ultrasonic echo signal is seen to be increasable by more than a factor of two.

It has been determined that the use of the DC bias current feedback circuit in FIG. 1 when used in conjunction with the often used impedance matching shunting capacitor 25 will result in an increase in the useful temperature measurement range of the system to several hundred degrees above the normal ultrasonic attenuation threshold at about 2,100°C.

This invention has been described by way of illustration rather than limitation and it should be apparent that it is equally applicable in fields other than those described. For example, it ma/be used in ultrasonic milling and welding applications.

What is claimed is:

1. In an ultrasonic thermometer system including a transducer coil encompassing a magnetostrictive transducer, a sensor wire coupled so said transducer, and a transmitter/receiver unit coupled to said transducer coil for supplying driving pulses to said coil and receiving time-separated echo signals from said sensor wire as a function of the temperature in the vicinity of said wire, the improvement comprising a DC current supply connected as a feedback circuit across said coil for adding a controlled DC bias thereto, said feedback circuit including a choke therein, said DC supply being connected to and controlled by one of said echo signals received by said transmitter/receiver to automatically adjust the DC current bias output of said supply to said coil, thereby substantially increasing the upper temperature sensing limit of said system.

2. The system set forth in claim 1, wherein the transmitter portion of said transmitter/receiver unit supplies to said coil a main bang pulse amplitude of 30 volts peak with a pulse width of 3 $\mu$sec. and at a pulse rate of 120 pps.

3. The system set forth in claim 1, wherein an impedance matching shunting capacitor is connected across the coupling between said transmitter/receiver and transducer coil.

* * * * *